United States Patent
Huynh

(10) Patent No.: US 12,328,473 B2
(45) Date of Patent: Jun. 10, 2025

(54) TOKEN MERGING FOR LEGACY CONTENT RECEIVING DEVICES

(71) Applicant: DISH Network L.L.C., Englewood, CO (US)

(72) Inventor: John Huynh, Denver, CO (US)

(73) Assignee: DISH NETWORK L.L.C., Englewood, CO (US)

( * ) Notice: Subject to any disclaimer, the term of this patent is extended or adjusted under 35 U.S.C. 154(b) by 74 days.

(21) Appl. No.: 18/497,194

(22) Filed: Oct. 30, 2023

(65) Prior Publication Data

US 2025/0142165 A1 May 1, 2025

(51) Int. Cl.
*H04N 21/44* (2011.01)
*H04N 21/442* (2011.01)
*H04N 21/658* (2011.01)
*H04N 21/81* (2011.01)

(52) U.S. Cl.
CPC ..... *H04N 21/44204* (2013.01); *H04N 21/658* (2013.01); *H04N 21/812* (2013.01)

(58) Field of Classification Search
CPC ........... H04N 21/44204; H04N 21/658; H04N 21/812
See application file for complete search history.

(56) References Cited

U.S. PATENT DOCUMENTS

| | | | | |
|---|---|---|---|---|
| 10,790,056 | B1 * | 9/2020 | Accomazzi | H04L 67/1097 |
| 11,184,455 | B1 * | 11/2021 | Gonzales | H04L 67/1095 |
| 2002/0152267 | A1 * | 10/2002 | Lennon | G06F 16/40 |
| | | | | 707/999.01 |
| 2003/0097657 | A1 * | 5/2003 | Zhou | H04N 21/454 |
| | | | | 725/38 |
| 2003/0226141 | A1 * | 12/2003 | Krasnow | H04N 21/2362 |
| | | | | 725/32 |
| 2004/0103120 | A1 * | 5/2004 | Fickle | G06Q 10/10 |
| 2008/0120637 | A1 * | 5/2008 | Deiss | H04N 21/4331 |
| | | | | 386/E5.052 |
| 2009/0158336 | A1 * | 6/2009 | Newdeck | G11B 27/322 |
| | | | | 725/44 |
| 2012/0144302 | A1 * | 6/2012 | Campanotti | H04N 21/262 |
| | | | | 715/716 |
| 2012/0159549 | A1 * | 6/2012 | Douillet | H04N 21/4622 |
| | | | | 725/48 |
| 2013/0014155 | A1 * | 1/2013 | Clarke | G11B 27/105 |
| | | | | 725/32 |
| 2015/0128174 | A1 * | 5/2015 | Rango | H04N 21/4532 |
| | | | | 725/34 |
| 2015/0142451 | A1 * | 5/2015 | Friedrich | G10L 19/008 |
| | | | | 704/500 |
| 2016/0094878 | A1 * | 3/2016 | McCoy | H04N 21/44213 |
| | | | | 725/14 |
| 2017/0257410 | A1 * | 9/2017 | Gattis | H04N 21/26258 |
| 2019/0037234 | A1 * | 1/2019 | Ahonen | H04N 19/179 |
| 2021/0099759 | A1 * | 4/2021 | Armstrong | H04N 21/6582 |
| 2021/0321168 | A1 * | 10/2021 | Ganuthula | H04N 21/26603 |
| 2021/0392386 | A1 * | 12/2021 | Hinds | G06F 3/012 |

* cited by examiner

*Primary Examiner* — Timothy R Newlin
(74) *Attorney, Agent, or Firm* — Seed IP Law Group LLP

(57) ABSTRACT

Technologies for content delivery and presentation tracking are disclosed. An example method includes tracking tokens generated during playback of a content stream, associating each of the tracked viewer measurement tokens with metadata that indicates timing, and merging the tracked viewer measurement tokens with baseline format tokens associated with the playback of the content stream, to generate merged token data.

20 Claims, 4 Drawing Sheets

TOKEN MERGING FOR LEGACY CONTENT RECEIVING DEVICES

BACKGROUND

This disclosure generally relates to the technology of content delivery and presentation tracking. Program distributors deliver audio and/or video program content to its subscribers. The program content includes, for example, television programs, multimedia services, and the like. Program distributors or other entities may further deliver advertisement content. The program distributors typically deliver the audio/video content to its subscribers in one of industry-standard formats, for example, the Moving Picture Experts Group (MPEG) MPEG-4 transport stream format. Subscribers often have a receiving device, such as a legacy set-top box (STB), which may include a digital video recorder (DVR) or other similar content recording functionality.

BRIEF SUMMARY

As stream-based content delivery and presentation increasingly utilizes new generation receiving devices that are more standardized and consume less computational resources, many local actions, commands, or events are handled by content servers that maintain streaming content and track its presentation for program subscribers. Viewer measurement tokens (e.g., representing or tracking actions, controls, events, etc. that occurred during the playback of content stream), which used to be stored and handled locally by legacy receiving devices, cannot easily be stored locally on new generation receivers (e.g., due to the lack of storage space, processing capability, or format compatibility). In the meantime, legacy receiving devices connected to the content delivery network may still generate viewer measurement tokens, which can be incompatible with a baseline format used by content servers (or other new generation receiving devices).

In some embodiments, the present disclosure provides a computer-implemented method for token management in connection with content stream playback. The method includes: tracking, by a content receiving device, viewer measurement tokens generated during playback of a content stream, wherein the viewer measurement tokens correspond to at least one of an action, control, or event associated with advertisement presentation that occurred during the playback of the content stream; associating, by the content receiving device, each of the tracked viewer measurement tokens with metadata that indicates timing corresponding to the tracked viewer measurement token; merging, by the content receiving device, the tracked viewer measurement tokens with a set of baseline format tokens associated with the playback of the content stream, to generate merged token data, wherein the baseline format is used by a content server for serving at least a portion of the content stream to the content receiving device and for communication with at least a new generation receiving device; and transmitting, by the content receiving device, the merged token data to the content server for storage.

In some embodiments, the content receiving device includes a set-top box (STB). In some embodiments the baseline format includes binary format.

In some embodiments each of the tracked viewer measurement tokens is associated with metadata in accordance with a format different than the baseline format. In some embodiments the format different than the baseline format includes a human-readable format.

In some embodiments, merging the tracked viewer measurement tokens with the set of baseline format tokens comprises filling a buffer of the content receiving device with the tracked viewer tokens and the set of baseline format tokens. In some embodiments the method further includes sorting the buffer based, at least in part, on metadata associated with the tracked viewer measurement tokens.

In some embodiments, the method further includes responsive to transmitting the merged token data, removing the tracked viewer measurement tokens and the set of baseline format tokens from the content receiving device.

In some embodiments, the merged token data is in baseline format.

In some embodiments, the present disclosure provides a system for token management in connection with content stream playback. The system includes memory that stores computer executable instructions and one or more processors that individually or collectively execute the computer executable instructions that cause the system to perform actions. The actions include: tracking viewer measurement tokens generated during playback of a content stream by the system, wherein the viewer measurement tokens correspond to at least one of an action, control, or event associated with advertisement presentation that occurred during the playback of the content stream; associating each of the tracked viewer measurement tokens with metadata that indicates timing corresponding to the tracked viewer measurement token; merging the tracked viewer measurement tokens with a set of baseline format tokens associated with the playback of the content stream, to generate merged token data, wherein the baseline format is used by a remote content server that serves at least a portion of the content stream; and transmitting the merged token data to the remote content server for storage.

In some embodiments, the baseline format includes binary format.

In some embodiments, each of the tracked viewer measurement tokens is associated with metadata in accordance with a format different than the baseline format. In some embodiments the format different than the baseline format includes a human-readable format.

In some embodiments, merging the tracked viewer measurement tokens with a set of baseline format tokens comprises filling a buffer with the tracked viewer tokens and the set of baseline format tokens. In some embodiments, the actions further include sorting the buffer based, at least in part, on metadata associated with the tracked viewer measurement tokens.

In some embodiments, the present disclosure provides one or more non-transitory computer-readable media collectively storing contents that, when executed by one or more processors, cause the one or more processors, individually or collectively, to perform actions. The actions include: tracking, by a content receiving device, viewer measurement tokens generated during playback of a content stream, wherein the viewer measurement tokens correspond to at least one of an action, control, or event associated with advertisement presentation that occurred during the playback of the content stream; associating, by the content receiving device, each of the tracked viewer measurement tokens with metadata that indicates timing corresponding to the tracked viewer measurement token; merging, by the content receiving device, the tracked viewer measurement tokens with a set of baseline format tokens associated with the playback of the content stream, to generate merged token data, wherein the baseline format is used by a content server that serves at least a portion of the content stream; and transmitting, by the content receiving device, the merged token data to the content server for storage.

In some embodiments, the merged token data is in baseline format. In some embodiments the baseline format includes binary format.

In some embodiments, merging the tracked viewer measurement tokens with the set of baseline format tokens comprises filling a buffer of the content receiving device with the tracked viewer tokens and the set of baseline format tokens and sorting the buffer based, at least in part, on metadata associated with the tracked viewer measurement tokens.

In some embodiments, the actions further include responsive to transmitting the merged token data, removing the tracked viewer measurement tokens and the set of baseline format tokens from the content receiving device.

Figure 1:
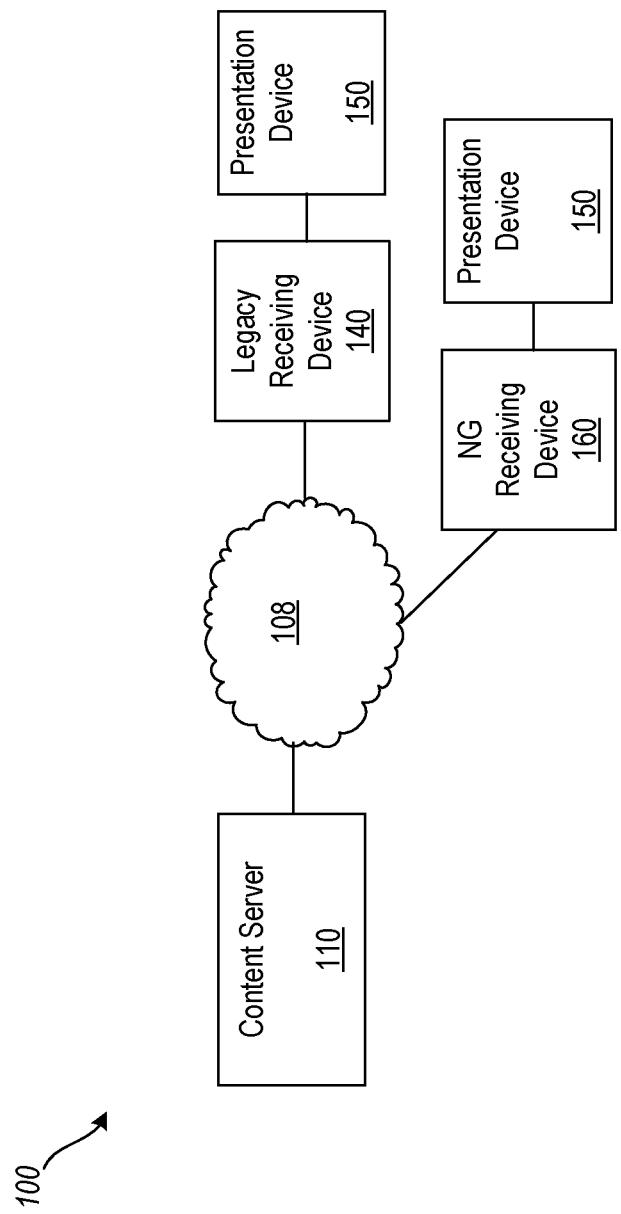
FIG. 1 is a block diagram illustrating an overview of a system for content delivery and presentation, according to some embodiments.

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility. Further, the particular shapes of the elements as drawn are not intended to convey any information regarding the actual shape of the particular elements and have been selected for ease of recognition in the drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

FIG. 1 is a block diagram illustrating an overview of a system 100 for content delivery and presentation, according to some embodiments. The system 100 may include a variety of communication systems and may use a variety of communication media including, but not limited to, satellite wireless media, cable media or any media over which communication of broadcast television programming, on-demand programming, and/or streaming media may occur, and/or over which Internet communication may occur.

The system 100 includes at least one content server 110, which can maintain or serve program content, advertisement content, or other content. Program content may be received from one or more content providers (not shown), which provide content such as video content and/or audio content (hereinafter "program content") to a distributor, such as a distributor operating the content server 110. The program content may include content provided from content providers such as television stations which provide local or national video programming, special content providers which provide premium based programming or pay-per-view programming, and/or radio stations which provide audio programming. In addition, or in the alternative, the program content may include content provided from on-demand content services, streaming media services, or the like, which provide audio, video, and other types of program content to the content server 110 for delivery of programming to receiving device(s) of a subscriber.

Advertisement content may be provided to, or accessible by, the content server 110 from one or more advertisement sources, which may be or include one or more databases storing advertisement content. Advertisement content may be provided to the content server 110 directly from advertisers, or from third party advertisement aggregators, services, or the like.

The content server 110 is coupled to one or more legacy receiving devices 140 over a communication network 108. The legacy receiving device 140 (e.g., a set-top box (STB), digital video recorder (DVR), media player, or mobile computing device) receives the program content and receives or accesses the advertisement content, and connects to a presentation device (e.g., a television, monitor or other display device) 150 to display or otherwise present the program content and advertisement content received from the content server 110. In some embodiments, the legacy receiving device 140 receives or accesses the advertisement content directly from the another source outside of the content server 110 via communication network 108, such as directly from advertisers, or from third party advertisement aggregators, services or the like. In some embodiments, the legacy receiving device 140 pre-downloads and locally stores at least some advertisement content, independently from receiving the program content.

The content server 110 is coupled with one or more new generation receiving devices 160 over the communication network 108. The new generation receiving device 160 (e.g., IP streaming device, memory stick, or smartphone) are more standardized and consume less computational resources than the legacy receiving device(s) 140. The content server 110 maintains and tracks content for streaming to the new generation receiving device 160, substantially reducing the local storage and processing of actions, commands, or events by the new generation receiving device 160. The new generation receiving device 160 connects to a presentation device (e.g., a television, monitor or other display device) 150 to display or otherwise present the program content and advertisement content streamed from the content server 110.

The communication network 108 may include many different types of communication media, now known or later developed. Non-limiting media examples include telephony systems, the Internet, internets, cable networks, fiber optic networks, microwave networks, asynchronous transfer mode (ATM) systems, frame relay networks, packet switched networks, digital subscriber loop (DSL) systems, radio frequency (RF) networks and satellite systems.

In some embodiments, the program content and/or advertisement content is converted by one or more devices (not shown) as necessary at the content server 110 into a suitable signal that is communicated (i.e., "uplinked") by one or more antennae to one or more satellites (not separately illustrated herein, although considered part of the communication network 108). It is to be appreciated that the communicated uplink signal may contain a plurality of multiplexed programs. The uplink signal is received by the satellite and then communicated (i.e., "downlinked") from the satellite in one or more directions, for example, onto a predefined portion of the planet. It is appreciated that the format of the above-described signals is adapted as necessary during the various stages of communication.

An antenna that is within reception range of the downlink signal communicated from satellite receives the above-described downlink signal. The antenna can be located at a subscriber's premises. Examples of subscriber premises include a residence, a business, a car, or any other suitable location operable to receive signals from satellite or other communication systems. The received signal is communicated, typically over a hard-wire connection, to the legacy receiving device 140, which converts the received signal into a signal suitable for communication to a presentation device 150.

The legacy receiving device 140 may receive content partially from, or entirely from, another source other than the above-described antenna. Other embodiments of the legacy receiving device 140 may receive locally broadcast RF signals, and/or may be coupled to communication network 108 via any suitable medium. Non-limiting examples of media communicatively coupling the legacy receiving device 140 to communication network 108 include cable, fiber optic, radio frequency, streaming or Internet media.

The legacy receiving device 140, as well as any other devices shown in FIG. 1 or other devices or systems described herein, may include at least one computer processor coupled to at least one non-transitory memory, and is configured to execute computer-executable instructions to carry out, enable and/or otherwise perform applicable actions described herein of the system 100 and the different embodiments described herein. The term legacy receiving device includes those products, devices, or technology that in place with a system, such as in a home, work location, network or other setting which continue to be used but are outdated, unsupported or no longer in production. The legacy devices 140 can include older computers, set-top boxes, routers, phone systems, software, outdated internet connection hardware and software and other electronic products that remain part of a system but are not compatible with some of the features and functions of the operating systems in current used. Examples of a legacy receiving device 140 include, but are not limited to: a television converter, receiver, set-top box (STB), television receiving device, television receiver, television recording device, satellite set-top box, satellite receiver, cable set-top box, cable receiver, personal computer, media player, mobile device, tablet computing device, smart phone and/or television tuner. Accordingly, the legacy receiving device 140 may be any suitable converter device or electronic equipment that is operable to receive programming (i.e., program content and advertisement content). Further, the legacy receiving device 140 may itself include user interface devices, such as buttons, switches, a display, and may include the presentation device 150. Additionally, the legacy receiving device 140 may include recording capability, and may be or include a digital video recorder (DVR).

Examples of a presentation device 150 include, but are not limited to: a television (TV), a personal computer (PC), a media player, mobile device, tablet computing device, smart phone or the like. Presentation devices 150 employ a display, one or more speakers and/or other output devices to communicate program content and/or advertisement content to a user. In many implementations, one or more presentation devices 150 reside in or near a subscriber's premises and are communicatively coupled, directly or indirectly, to the legacy receiving device 140.

Figure 2:
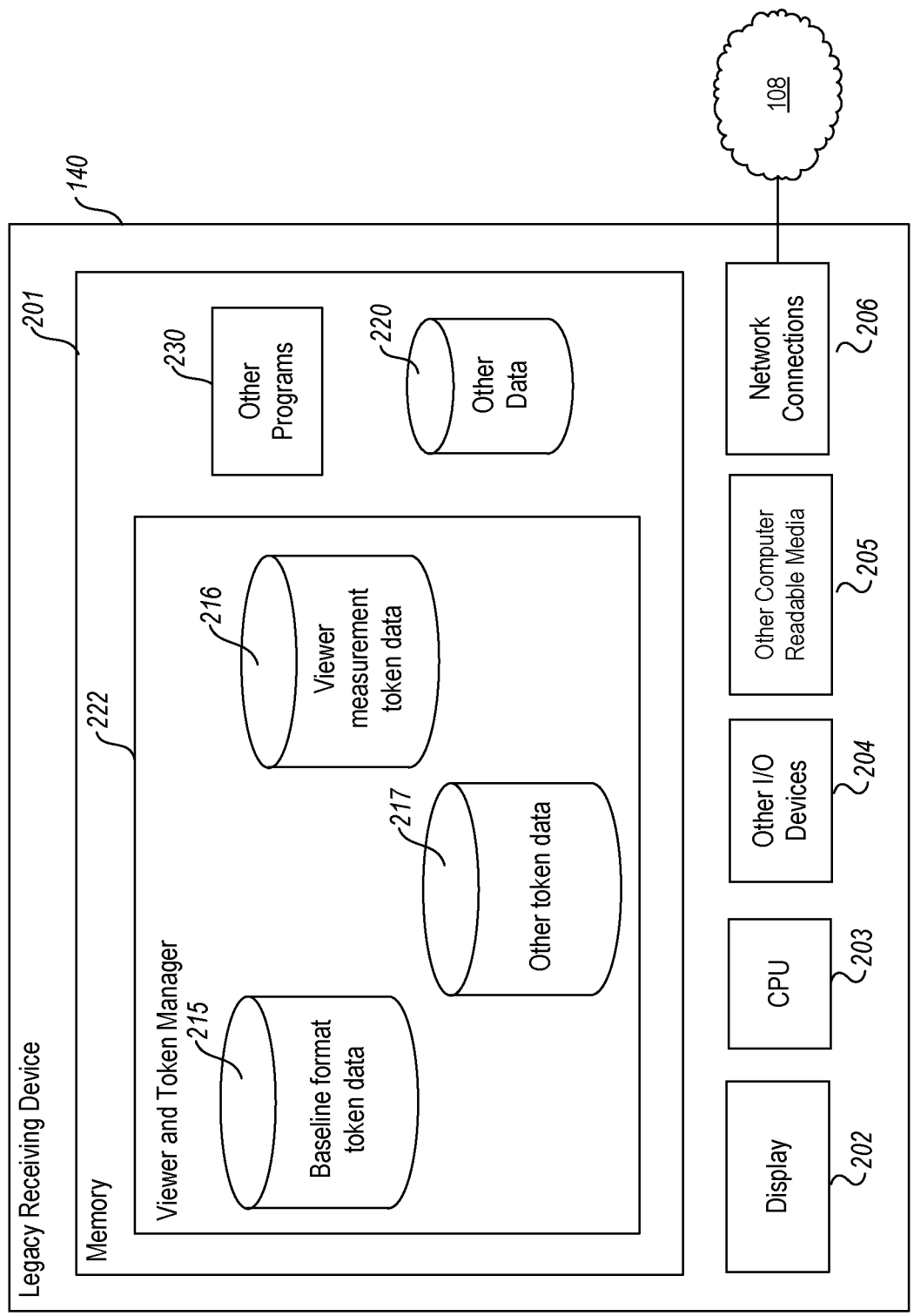
FIG. 2 is a block diagram illustrating elements of an example legacy receiving device, according to some embodiments.

FIG. 2 is a block diagram illustrating elements of an example legacy receiving device 140, according to some embodiments.

In some embodiments, the legacy receiving device 140 is a device configured to play media content on a presentation device. The legacy receiving device may display programming and/or play audio on a presentation device, such as on a display or speaker. The legacy receiving device 140 may also be configured to receive and record such content from remote sources. In some embodiments, the legacy receiving device 140 is a presentation device, such as a television, smartphone, smart speaker, internet appliance or tablet device, or may be a set-top box or digital video recorder (DVR) device.

Note that one or more general purpose or special purpose computing systems/devices may be used to operate the legacy receiving device 140. In addition, the legacy receiving device 140 may include one or more distinct computing systems or devices, and may span distributed locations. Furthermore, each block shown may represent one or more such blocks as appropriate to a specific embodiment or may be combined with other blocks. Also, the viewer and token manager 222 may be implemented in software, hardware, firmware, or in some combination to achieve the capabilities described herein.

In example shown, the legacy receiving device 140 includes a computer memory ("memory") 201, a display 202, one or more Central Processing Units or other processors ("CPU") 203, Input/Output devices 204 (e.g., button panel, RF or infrared receiver, light emitting diode (LED) panel, liquid crystal display (LCD), USB ports, digital audio, High-Definition Multimedia Interface (HDMI) ports, other communication ports, and the like), other computer-readable media 205, and network connections 206 (e.g., Wi-Fi interface(s), Bluetooth® interface, short range wireless interface, personal area network interface, Ethernet port(s), and/or other network ports). The presentation device 150 shown in FIG. 1 may be coupled to the legacy receiving device 140 via one or more Input/Output devices 204 and/or network connections 206, such as an HDMI port, Wi-Fi interface and/or Bluetooth® interface, for example.

The viewer and token manager 222 is shown residing in memory 201. In other embodiments, some portion of the contents and some, or all, of the components of the viewer and token manager 222 may be stored on and/or transmitted over the other computer-readable media 205. The components of the legacy receiving device 140 and the viewer and token manager 222 can execute on one or more CPUs or other processors 203 and facilitate the content playback or token management in accordance with various embodiments described herein. The viewer and token manager 222 can include a baseline format token data storage 215 configured to store token data compatible with the baseline format used by the content server 110, a viewer measurement token data storage 216 configured to store viewer measurement token data (e.g., associated with advertisement presentation) incompatible with the baseline format, and other token data storage 217 configured to store other token data such as timing or context.

As described herein, the viewer and token manager 222 may interact via the communication system 108 with other devices. For example, the other device may be a home computing system (e.g., a desktop computer, a laptop computer, mobile device, etc.) that includes or has access to (e.g., via communication system 108) the functionality of the content server 110 or other systems.

Other code or programs 230 (e.g., an audio/video processing module, a program guide manager module, a Web server, and the like), and potentially other data repositories, such as data repository 220 for storing other data (user profiles, preferences and configuration data, etc.), also reside in the memory 201, and can execute on one or more CPUs 203. Of note, one or more of the components in FIG. 2 may or may not be present in any specific implementation. For example, some embodiments may not provide other computer readable media 205 or a display 202.

In some embodiments, the viewer and token manager 222 includes an application program interface ("API") that provides programmatic access to one or more functions of the legacy receiving device 140 and the viewer and token manager 222. For example, such an API may provide a programmatic interface to one or more functions of the viewer and token manager 222 that may be invoked by one of the other programs 230, content server 110, or some other module or system. In this manner, the API may facilitate the development of third-party software, such as user interfaces, plug-ins, adapters (e.g., for integrating functions of the viewer and token manager 222), and the like to facilitate various functionalities described herein.

In an example embodiment, components/modules of the legacy receiving device 140 and the viewer and token manager 222 are implemented using standard programming techniques. For example, the viewer and token manager 222 may be implemented as a "native" executable running on the CPU 203, along with one or more static or dynamic libraries. In other embodiments, the legacy receiving device 140 and the viewer and token manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like). In a software or firmware implementation, instructions stored in a memory configure, when executed, one or more processors of the legacy receiving device 140 to perform the functions of the viewer and token manager 222.

The embodiments described above may also use other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a viewer and token manager 222 implementation. Also, other functions could be implemented and/or performed by each component/module, and in different orders, and by different components/modules, yet still achieve the functions of the legacy receiving device 140 and the viewer and token manager 222.

In addition, programming interfaces to the data stored as part of the legacy receiving device 140 and the viewer and token manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The baseline format token data storage 215, the viewer measurement token data storage 216, and the other token data storage 217 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the viewer and token manager 222.

Furthermore, in some embodiments, some or all of the components of the legacy receiving device 140 and the viewer and token manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
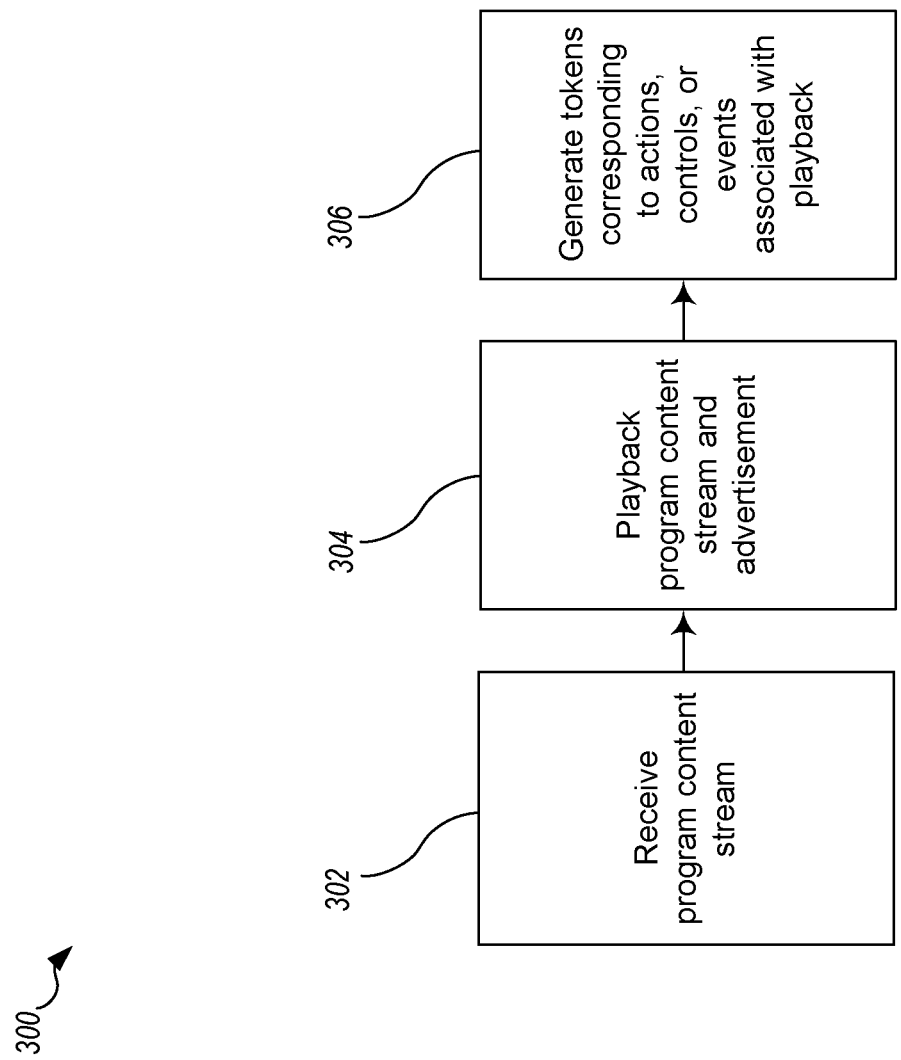
FIG. 3 is a flowchart illustrating a method for content playback and token generation, according to some embodiments.

FIG. 3 is a flowchart illustrating a method 300 for content playback and token generation, according to some embodiments. The method 300 can be implemented, at least in part, by the legacy receiving device 140.

At block 302, the method 300 includes receiving a program content stream, for example, from the content server 110. As described above, the program content includes, for example, television programs, multimedia services, and the like. It can be delivered in an industry-standard format, at a certain resolution, based on a type of compression technique, associated with a particular content identification, carrying timing parameters for the stream, or otherwise including information specifically usable to a pre-configured decoder of the legacy receiving device 140 for decoding and presentation of the program content stream.

At block 304, the method 300 includes playing back the program content stream in conjunction with advertisement presentation. The legacy receiving device 140 can determine the timing and content for advertisement playback, before, during, or after the playback of one or more portions of the program content stream, e.g., based on advertisement insertion requests or commands that are locally generated or remotely received. In some embodiments, the advertisement played back is downloaded and stored locally on the legacy receiving device.

At block 306, the method 300 includes generating tokens corresponding to actions, controls, and events associated with the playing back. The tokens can include viewer measurement tokens that represent or track various types of local processing and presentation of content or advertisement. The tokens can also include other types of tracking information (e.g., not originated locally from the legacy receiving device). At least a subset of the viewer measurement tokens (e.g., relating to advertisement processing or presentation) is in a format different than or incompatible with a baseline format used by the content server 110.

Figure 4:
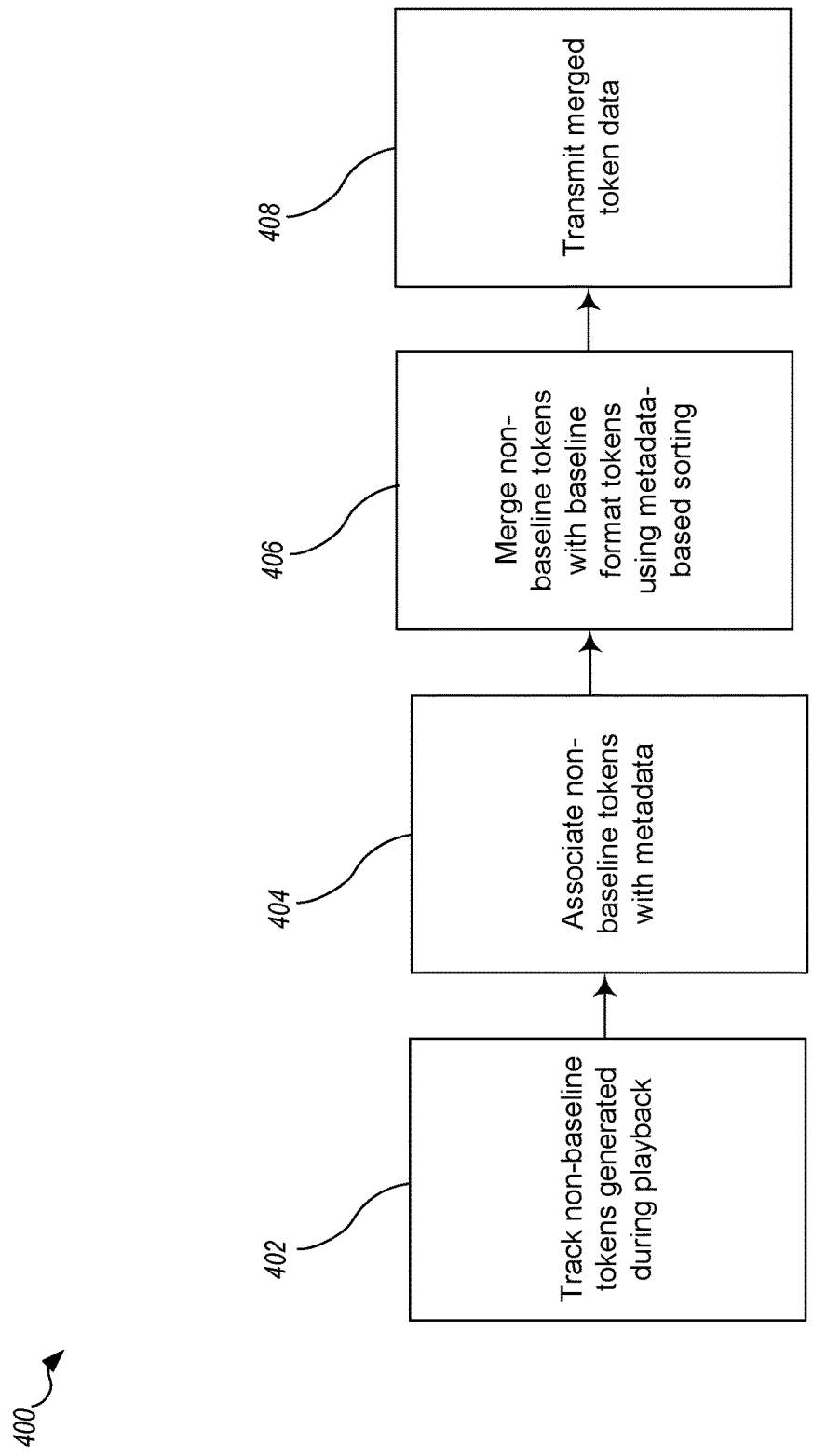
FIG. 4 is a flowchart illustrating a method for token tracking and merging, according to some embodiments.

FIG. 4 is a flowchart illustrating a method 400 for token tracking and merging, according to some embodiments. The method 400 can be implemented, at least in part, by the legacy receiving device 140.

At block 402, the method 400 includes tracking non-baseline tokens generated during playback of content. Illustratively, the legacy receiving device 140 can track viewer measurement tokens generated during playback of a content stream, which may be incompatible for local storage or processing at the receiving device. The tracked tokens can include viewer measurement tokens corresponding to at least one of an action, control, or event (e.g., to indicate start, end, pause, ad type, ad format, or the like) associated with advertisement presentation that occurred during the playback of the content stream.

At block 404, the method 400 includes associating each of the tracked non-baseline tokens with metadata that indicates timing corresponding to the tracked token. In some embodiments, the baseline format (e.g., used by the content server) is a binary format; each of the tracked tokens is associated with metadata in accordance with a format different than the baseline format. The format different than the baseline format can be a human-readable format (e.g., JSON format). In some embodiments, the metadata associated with a tracked token includes timestamp(s), time offset(s), or other temporal indicator(s) to indicate a temporal location of the token relative to the playback of the content stream.

At block 406, the method 400 includes merging the tracked non-baseline tokens with a set of baseline format tokens associated with the playback of the content stream, to generate merged token data. The set of baseline format tokens may or may not be generated by the legacy receiving device, and the baseline format tokens may each include baseline format timing information. The merging can be performed by filling a buffer or other temporary data storage of the legacy receiving device with the tracked tokens and the set of baseline format tokens. The buffer filling can be performed while playback is ongoing and the tokens are being tracked, or thereafter. Once the buffer filling is completed, the buffer can be sorted based at least in part on metadata associated with the tracked tokens. The sorting creates a buffer of tokens that are arranged in the correct temporal order with respect to the playback of the content stream. Content of the buffer can be converted into a file including merged tokens. In some embodiments, all tokens in the resulting file are converted to baseline format.

At block 408, the method 400 includes transmitting the merged token data to the content server 110 for storage. In some embodiments, responsive to transmitting the merged token data, the legacy receiving device removes the merged token data, the tracked token data, and the set of baseline format tokens from the local storage.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for token management in connection with content stream playback, the method comprising:
    tracking, by a legacy receiving device, viewer measurement tokens generated during playback of a content stream, wherein the viewer measurement tokens correspond to at least one of an action, control, or event associated with an advertisement presentation that occurred during the playback of the content stream;
    associating, by the legacy receiving device, each of the tracked viewer measurement tokens with metadata that indicates timing corresponding to the tracked viewer measurement token;
    merging, by the legacy receiving device, the tracked viewer measurement tokens with a set of baseline format tokens associated with the playback of the content stream, to generate merged token data, wherein the baseline format is used by a content server for serving at least a portion of the content stream to the legacy receiving device and for communication with at least a new generation receiving device; and
    transmitting, by the legacy receiving device, the merged token data to the content server for storage.

2. The method of claim 1, wherein the legacy receiving device includes a set-top box (STB).

3. The method of claim 1, wherein the baseline format includes binary format.

4. The method of claim 1, wherein each of the tracked viewer measurement tokens is associated with metadata in accordance with a format different than the baseline format.

5. The method of claim 4, wherein the format different than the baseline format includes a human-readable format.

6. The method of claim 1, wherein merging the tracked viewer measurement tokens with the set of baseline format tokens comprises filling a buffer of the legacy receiving device with the tracked viewer measurement tokens and the set of baseline format tokens.

7. The method of claim 6, wherein the method further comprises sorting the buffer based, at least in part, on metadata associated with the tracked viewer measurement tokens.

8. The method of claim 1, further comprising responsive to transmitting the merged token data, removing the tracked viewer measurement tokens and the set of baseline format tokens from the legacy receiving device.

9. The method of claim 1, wherein the merged token data is in baseline format.

10. A system for token management in connection with content stream playback, comprising:
    memory that stores computer executable instructions; and
    one or more processors that individually or collectively execute the computer executable instructions that cause the system to perform actions comprising:
        tracking viewer measurement tokens generated during playback of a content stream by the system, wherein the viewer measurement tokens correspond to at least one of an action, control, or event associated with advertisement presentation that occurred during the playback of the content stream;
        associating each of the tracked viewer measurement tokens with metadata that indicates timing corresponding to the tracked viewer measurement token;
        merging the tracked viewer measurement tokens with a set of baseline format tokens associated with the playback of the content stream, to generate merged token data, wherein the baseline format is used by a remote content server that serves at least a portion of the content stream; and
        transmitting the merged token data to the remote content server for storage.

11. The system of claim 10, wherein the baseline format includes binary format.

12. The system of claim 10, wherein each of the tracked viewer measurement tokens is associated with metadata in accordance with a format different than the baseline format.

13. The system of claim 12, wherein the format different than the baseline format includes a human-readable format.

14. The system of claim 10, wherein merging the tracked viewer measurement tokens with a set of baseline format tokens comprises filling a buffer with the tracked viewer tokens and the set of baseline format tokens.

15. The system of claim 14, wherein the actions further comprise sorting the buffer based, at least in part, on metadata associated with the tracked viewer measurement tokens.

16. One or more non-transitory computer-readable media collectively storing contents that, when executed by one or more processors, cause the one or more processors, individually or collectively, to perform actions comprising:
    tracking, by a content receiving device, viewer measurement tokens generated during playback of a content stream, wherein the viewer measurement tokens correspond to at least one of an action, control, or event associated with advertisement presentation that occurred during the playback of the content stream;
    associating, by the content receiving device, each of the tracked viewer measurement tokens with metadata that indicates timing corresponding to the tracked viewer measurement token;
    merging, by the content receiving device, the tracked viewer measurement tokens with a set of baseline format tokens associated with the playback of the content stream, to generate merged token data, wherein the baseline format is used by a content server that serves at least a portion of the content stream; and
    transmitting, by the content receiving device, the merged token data to the content server for storage.

17. The one or more non-transitory computer-readable media of claim 16, wherein the merged token data is in baseline format.

18. The one or more non-transitory computer-readable media of claim 16, wherein the baseline format includes binary format.

19. The one or more non-transitory computer-readable media of claim 16, wherein merging the tracked viewer measurement tokens with the set of baseline format tokens comprises filling a buffer of the content receiving device with the tracked viewer tokens and the set of baseline format tokens and sorting the buffer based, at least in part, on metadata associated with the tracked viewer measurement tokens.

20. The one or more non-transitory computer-readable media of claim 16, wherein the actions further comprise responsive to transmitting the merged token data, removing the tracked viewer measurement tokens and the set of baseline format tokens from the content receiving device.

\* \* \* \* \*